（12）United States Patent
Seong et al.

(10) Patent No.: US 8,949,057 B1
(45) Date of Patent: Feb. 3, 2015

(54) METHOD FOR COMPENSATING FOR WAFER SHAPE MEASUREMENT VARIATION DUE TO VARIATION OF ENVIRONMENT TEMPERATURE

(75) Inventors: Kibyung Seong, Fremont, CA (US); Shouhong Tang, Santa Clara, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 621 days.

(21) Appl. No.: 13/283,330

(22) Filed: Oct. 27, 2011

(51) Int. Cl.
*G01B 9/02* (2006.01)

(52) U.S. Cl.
CPC .................. *G01B 9/02007* (2013.01)
USPC .......................................................... 702/99

(58) Field of Classification Search
CPC ..................... G01B 2290/70; G01B 9/02007
USPC .......................................................... 702/99
See application file for complete search history.

(56) References Cited

U.S. PATENT DOCUMENTS

| 5,991,033 | A  | * | 11/1999 | Henshaw et al. | ............ | 356/487 |
| 6,770,852 | B1 |   | 8/2004  | Steger         |             |         |
| 6,924,894 | B2 |   | 8/2005  | Hoult, Jr.     |             |         |
| 7,180,603 | B2 |   | 2/2007  | Hill           |             |         |
| 2005/0237536 | A1 | * | 10/2005 | Hill et al.   | ............ | 356/500 |
| 2010/0195112 | A1 | * | 8/2010 | Davidson      | ............ | 356/498 |
| 2011/0019170 | A1 | * | 1/2011 | Kayama et al. | ............ | 355/30  |

* cited by examiner

*Primary Examiner* — Bryan Bui
(74) *Attorney, Agent, or Firm* — Deborah W. Wenocur

(57) ABSTRACT

Disclosed herein is a method and apparatus for reducing measurement error resulting from temperature variations across a wafer, without measuring the wafer temperature, the temperature gradient in the surrounding air, or the distribution of the index of refraction of the air.

8 Claims, 4 Drawing Sheets

METHOD FOR COMPENSATING FOR WAFER SHAPE MEASUREMENT VARIATION DUE TO VARIATION OF ENVIRONMENT TEMPERATURE

FIELD OF THE INVENTION

This invention relates to measurement systems, and in particular to compensating for wafer measurement variations due to temperature variations across the wafer, particularly relating to optical interferometer measurements.

BACKGROUND

Dual channel reflection-type interferometers are a preferred tool used for measuring wafer shape for semiconductor processing applications. An example of such a dual channel reflection-type interferometer tool is WaferSight from KLA-Tencor. A side view diagram of a WaferSight tool 100 is shown in FIG. 1*a*. Wafer 102 is positioned within cavity 105. FIG. 1*b* shows a front view of cavity 105, showing wafer region 107 and cavity ring region 108, an annular region within the cavity but outside wafer region 107.

WaferSight uses two channels. Each measures the optical interference signal from two beams, a first reflected beam from wafer surface 110, 111 and a second reflected beam reflected from internal reference surface 120, 121, for measurement of the wafer surfaces. For Channel A interferometer (125), the phase change between wafer surface 110 and reference surface 120 is measured by using multiple phase shifted interference signals. For Channel B interferometer (130), the phase change between wafer surface 111 and reference surface 121 is measured. After the phase changes are measured by the associated interferometers, the wafer surfaces are determined as follows:

$$\Delta Z(x,y) = \Delta \Phi(x,y) \lambda / (4n\pi) \quad (1)$$

where $\Delta\Phi(x,y)$ equals the phase change, $\lambda$ is the wavelength of the illuminator, n is the index of refraction of the air.

Equation (1) is not exact if the index of refraction of the air in spatially inhomogeneous. This situation occurs if the air temperature is not spatially constant, since the index of refraction of air varies with the air temperature. This relationship (i.e. between air index of refraction and air temperature) can be described empirically using the Sellmeier equation fitting curve, described at http://en.wikipedia.org/wiki/Sellmeier_formula. The exact theoretical relationship is $$(n-1)/(ns-1) = 0.0028426 * P/(T*Z)$$

where ns is the standard index at ambient temperature and pressure,

P is pressure in Pascal,

T is temperature in degrees Kelvin, and Z is a compressibility factor.

FIG. 2 illustrates the variation in air temperature caused by mounting a wafer with a different temperature from the tool. Wafer 200 is vertically mounted in a tool such as WaferSight, for measurement. Due to the difference between the wafer temperature and the surrounding ambient temperature of the tool region, air in top region 205 is hotter than air in bottom region 210. This induces a temperature gradient in air regions 215 and 220, due to natural convection. This temperature gradient in the air adjacent the measurement surfaces of the wafer causes a gradient in the air index of refraction, resulting in additional measured phase changes, which degrades the measurement precision.

Several prior methods have been proposed to correct the temperature-induced measurement errors:

1. U.S. Pat. No. 7,180,603, issued Feb. 20, 2007, discloses a method for reducing the additional measured optical path difference between the reference beam and the test beam by using compensating material or by mechanically mounting the interferometer to be insensitive to thermal changes.
2. U.S. Pat. No. 6,770,852, issued Aug. 3, 2004, discloses a method for controlling the local temperature of the measurement chamber in order to maintain the target critical dimension of the wafer, by using an in-situ temperature controller during the wafer etching process.
3. U.S. Pat. No. 6,924,894, issued Aug. 2, 2005, discloses a temperature compensated interferometer which maintains parity in the two beam paths (or optical fiber lengths) even with temperature perturbations.

Each of the above proposed methods has drawbacks. All three of the methods require a separate, complicated, submodule to control the temperature. In addition, method 2 cannot compensate the shape (e.g., line height, trench depth, sidewall angle) of the critical dimension (CD) test feature on the wafer inside the local temperature-controlled area. And method 3 requires a long settling time for stabilization of the system following heating/cooling of two fibers.

SUMMARY OF THE INVENTION

Disclosed herein is a method and apparatus for reducing measurement error resulting from temperature variations across a wafer, without measuring the wafer temperature, the temperature gradient in the surrounding air, or the distribution of the index of refraction of the air.

DETAILED DESCRIPTION

The inventive method and system is directed to monitoring and compensating for measurement error in an interferometric system caused by thermally induced changes in air index of refraction and resulting optical path length differences.

Described hereinafter is an example of a systematic method for detecting and reducing measurement errors induced into the dual channel reflection-type interferometer wafer measurement system by temperature gradients. Note that the details of the method are exemplary and not limiting. Other methods may be used to compensate for the thermally induced changes in optical path length differences, without departing from the inventive concept.

Neither the wafer temperature, the temperature gradient of the air, or the refractive index gradient of the air are easily measured. The inventive method embodiment disclosed herein provides an indirect detection of air temperature gradient, and provides a method to compensate for the measurement error caused by this temperature gradient. The indirect detection and compensation of this embodiment are derived from additional tilt between transmission flats (cavity tilt) which appears on the measured phase map due to the temperature gradient. The cavity tilt may be measured in the WaferSight tool at the same time the wafer surface measurements are being made. Since the measurement aperture or cavity 105 is larger than the wafer 102, a region 108 remains outside the wafer, known as the cavity ring. The cavity tilt may be measured and calculated from data obtained in the cavity ring region. Larger temperature gradient results in larger additional cavity tilt. The temperature gradient can be calculated from the measured cavity tilt.

To compensate for surface measurement error due to the temperature gradient, a weighting factor may be calculated from the measured cavity tilt information. The derivation of the weighting factor calculation may be obtained for each run of wafers by doing a single calibration measurement. Two separate sets of surface measurements (each yielding a wafer map) may be performed on a single reference wafer. A first set of surface measurements and cavity tilt measurements are taken when a temperature gradient exists, i.e., when the wafer temperature differs from the temperature of the surrounding measurement system. A second set of surface measurements and cavity tilt measurements on the same wafer are taken after the wafer has thermally stabilized, i.e., the wafer temperature has reached substantially the same temperature as that of the surrounding measurement system. A reference subtraction map may then be calculated from the two sets of surface measurements, yielding a map of the thermal gradient-induced measurement error. An additional tilt due to thermal effects is also measured. The thermally induced additional cavity tilt measured for the reference wafer is termed the reference Δ cavity tilt value.

Figure 1A:
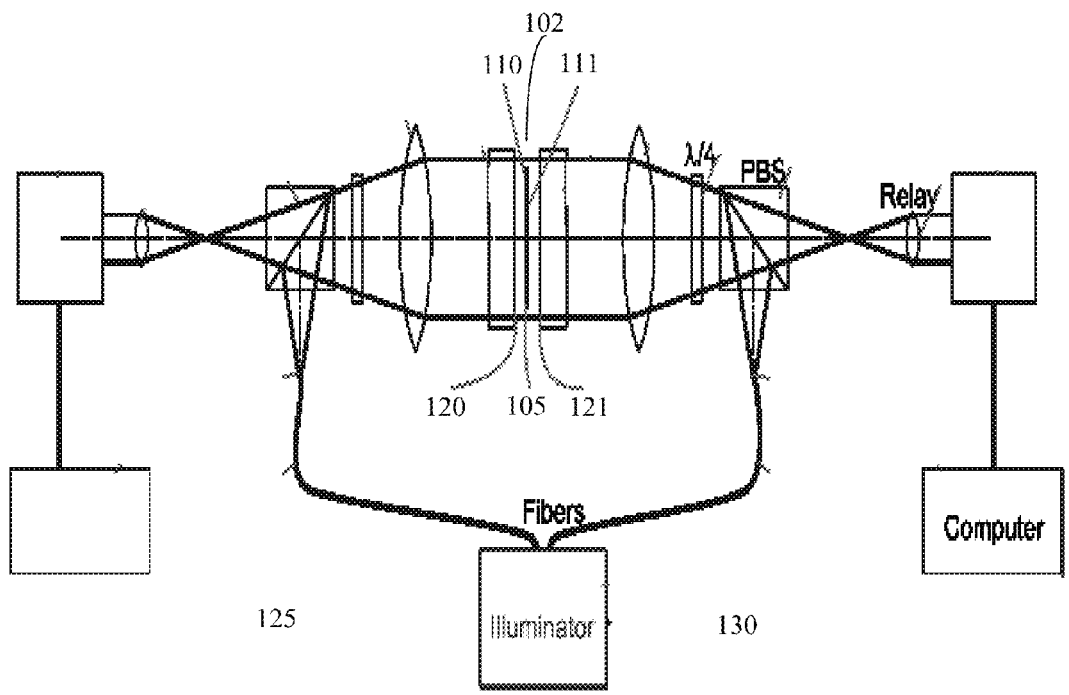
FIG. 1*a* is a side view diagram of a WaferSight tool.
Figure 1B:
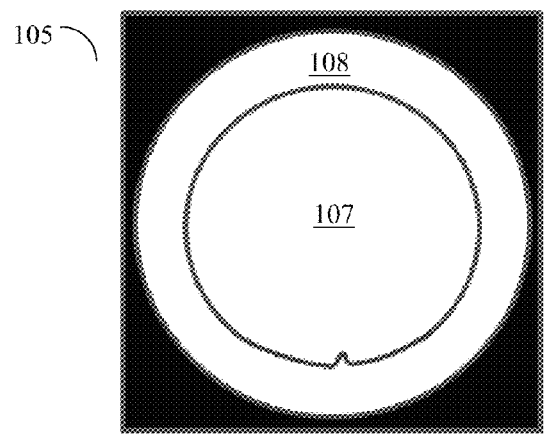
FIG. 1*b* shows a front view of the cavity, showing the wafer region and the cavity ring region.
Figure 2:
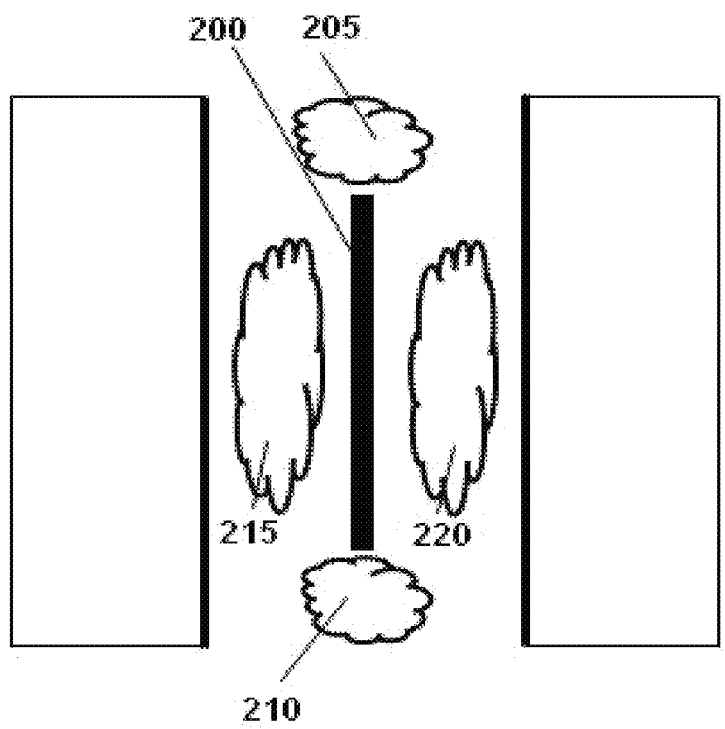
FIG. 2 illustrates the variation in air temperature caused by mounting a wafer with a different temperature from the tool.
Figure 3:
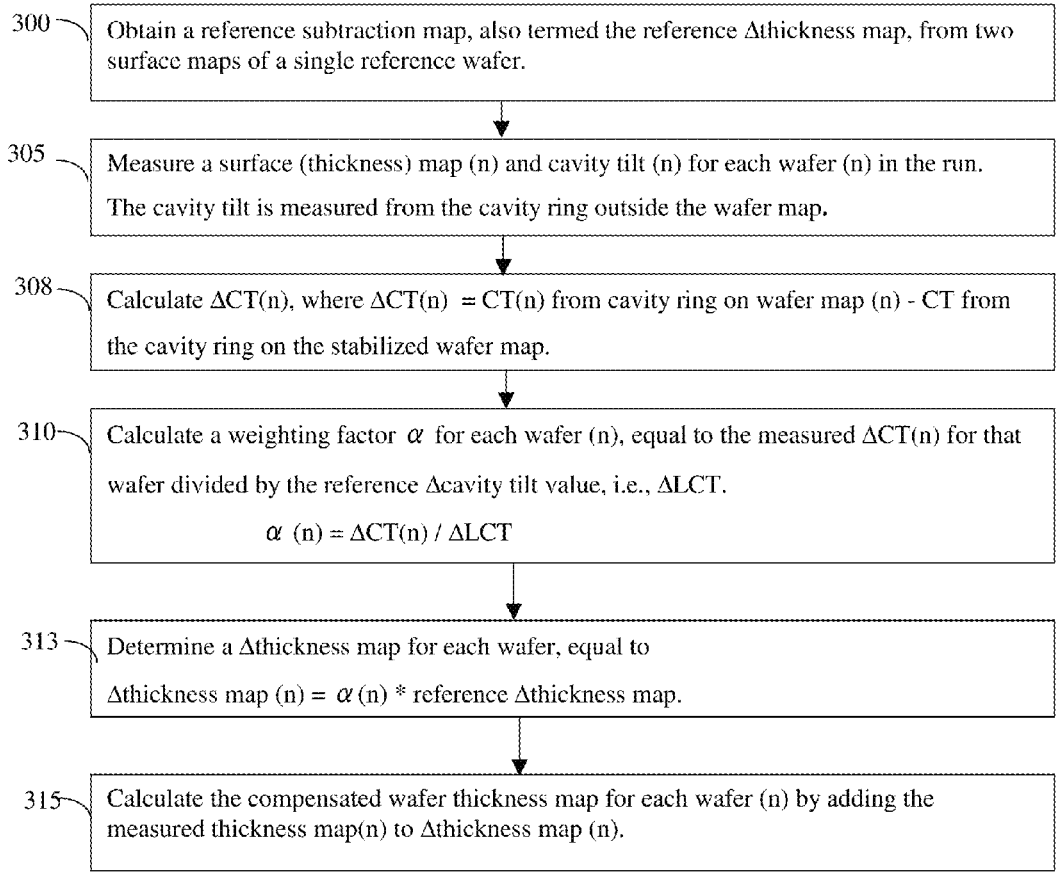
FIG. 3 is a flow diagram describing the inventive process steps of an embodiment of the inventive method.

FIG. 3 is a flow diagram describing the inventive process steps of the above embodiment. These steps will in general be computer controlled and implemented.

In step 300, the calibration step, obtain a reference subtraction map, also termed the reference Δthickness map, from two surface maps of a single reference wafer. In general, the two surface maps are selected so that the first is taken from the first measurement cycle and the second is taken from the last measurement cycle. The first surface thickness map measurement is generally taken from the wafer having the largest temperature variation of the run, in general the first wafer of the first measurement cycle, when the wafer temperature is substantially higher or lower than that of the measurement tool, and the second surface thickness map measurement is taken from the same wafer, but after sufficient time has elapsed for the wafer temperature to stabilize and equalize with that of the measurement tool. Subtracting the second thickness map from the first thickness map thereby yields the largest (for the measurement run) change in thickness measurement due to thermal effects. Obtained at the same time as the surface thickness map measurements is the cavity tilt measurement from the cavity ring, as described above. The measured cavity tilt from the first wafer of the first cycle before temperature stabilization will include the largest additional measured cavity tilt (ΔCT) from thermal effects. Since the reference subtraction map yielding the reference Δthickness map is obtained for the largest change in temperature for the measurement run, it will also yield the largest additional cavity tilt for the measurement run, also termed (ΔLCT). Note that this method may also be implemented with a reference wafer that is not necessarily having the largest temperature variation of the run. What is critical is that the reference Δthickness map is obtained by subtracting a thickness map of a thermally stabilized wafer from a thickness map of the same wafer at a temperature substantially higher or lower than that of the measurement tool.

Steps 305-315 are application steps:

In step 305, measure a surface (thickness) map (n) and cavity tilt (n) for each wafer (n) in the run. The cavity tilt is measured from the cavity ring outside the wafer map.

In step 308, calculate δCT (n), where ΔCT(n)=CT(n) from cavity ring on wafer map (n)−CT from the cavity ring on the stabilized wafer map. In step 310, calculate a weighting factor α for each wafer (n), equal to the measured ΔCT(n) for that wafer divided by the reference Δcavity tilt value, i.e., ΔLCT.

$$\alpha(n)=\Delta CT(n)/\Delta LCT$$

In effect, this step is using the measured cavity tilt for each wafer as a comparison parameter to quickly and easily derive measurement error for each wafer from the complete measurement error map obtained from the reference wafer.

In step 313, determine a Δthickness map for each wafer, equal to Δthickness map(n)=α(n)*reference Δthickness map. This Δthickness map (n) is the estimated measurement error map due to thermal effects, obtained by weighting the experimentally determined reference measurement error map by the relative cavity tilt values of wafer (n) compared to the reference wafer.

In step 315, calculate the compensated wafer thickness map for each wafer (n) by adding the measured thickness map(n) to Δthickness map (n).

Note that cavity tilt is one example of a parameter which can be used to compare measurement error for a general wafer with measurement error from a reference wafer. Note that this choice of comparison parameter is exemplary and not limiting. Other examples of possible comparison parameters are: the number of interference fringes, or the spacing of the interference fringes.

Figure 4:
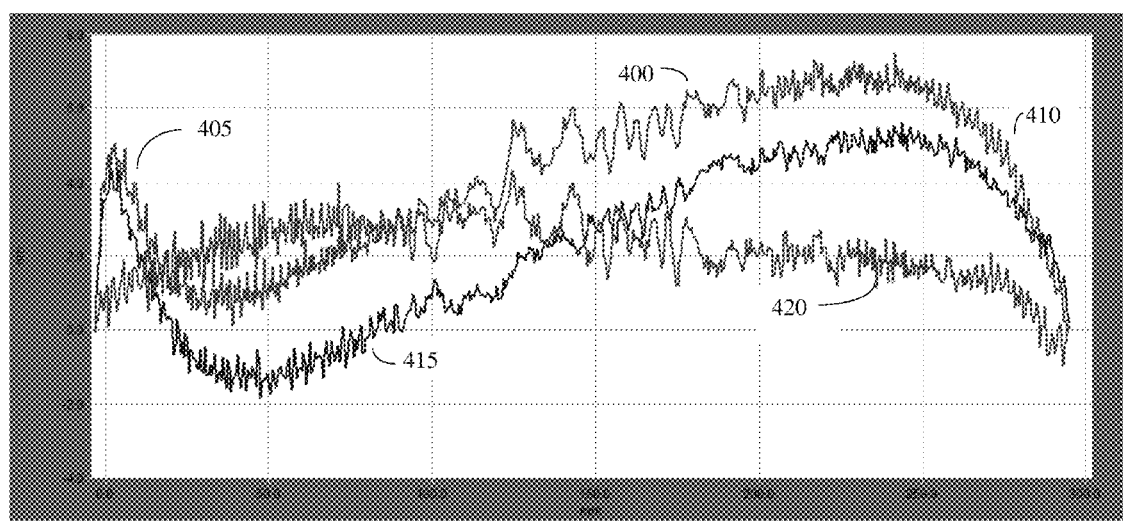
FIG. 4 shows an example of improvement in wafer thickness map results using the inventive method.

FIG. 4 shows an example of improvement in wafer thickness map results using the inventive method. The graph shows the x-profile of a wafer at different stages of the compensation process. Curve 400 shows the uncompensated x-profile of a subject wafer, including edge regions 405, 410 having steep slopes. Curve 415 shows the compensation profile, calculated to be weighting factor 0.61 times the reference Δthickness map, according to the relative ΔCT for the subject wafer and the reference wafer. Curve 420 shows the compensated x-profile of the subject wafer, obtained by subtracting the compensation profile 415 from the uncompensated profile 400. Note that in the compensated profile the steep slopes in edge regions 405, 410 are greatly reduced.

System Considerations

The inventive methods or portions thereof may be computer-implemented. The computer system may include a processor (e.g. a processor core, a microprocessor, a computing device, etc), a main memory and a static memory, which communicate with each other via a bus. The machine may further include a display unit that may comprise a touchscreen, or a liquid crystal display (LCD), or a light emitting diode (LED) display, or a cathode ray tube (CRT). As shown, the computer system also may include a human input/output (I/O) device (e.g. a keyboard, an alphanumeric keypad, etc), a pointing device (e.g. a mouse, a touch screen, etc), a drive unit (e.g. a disk drive unit, a CD/DVD drive, a tangible computer readable removable media drive, an SSD storage device, etc), a signal generation device (e.g. a speaker, an audio output, etc), and a network interface device (e.g. an Ethernet interface, a wired network interface, a wireless network interface, a propagated signal interface, etc).

The drive unit may include a machine-readable medium on which is stored a set of instructions (i.e. software, firmware, middleware, etc) embodying any one, or all, of the methodologies described above. The set of instructions is also shown to reside, completely or at least partially, within the main memory and/or within the processor. The set of instructions may further be transmitted or received via the network interface device over the network bus.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; electrical, optical, acoustical or other form of propagated signals (e.g. carrier waves, infrared signals, digital signals, etc); or any other type of media suitable for storing or transmitting information.

It is not expected that the invention be restricted to the exact embodiments disclosed herein. Those skilled in the art will recognize that changes and modifications may be made without departing from the inventive concept. Other parameters and methods for compensating for thermally induced measurement errors in the wafer surface maps may be employed. The scope of the invention should be construed in view of the claims.

The invention claimed is:

1. A machine-readable storage medium storing computer-readable instructions that, when executed, cause a computer to perform the functions of:
   determining a first reference cavity tilt value between transmission flats of an interferometric measuring system when a temperature gradient exists between said interferometric measuring system and a reference wafer mounted in the cavity of said interferometric measuring system;
   determining a second reference cavity tilt value between transmission flats of said interferometric measuring system when said reference wafer mounted in the cavity of said interferometric measuring system has thermally stabilized such that said reference wafer is at substantially an equal temperature to said interferometric system;
   calculating a third reference cavity tilt value equal to the difference between the first reference cavity tilt value and the second reference cavity tilt value; and
   using said first cavity tilt value and said second cavity tilt value to determine and compensate for thermally induced errors in measurement of a sample by said interferometric measuring system.

2. The machine-readable storage medium of claim 1, wherein said sample is a sample semiconductor wafer and said interferometric measuring system is performing surface thickness measurements of said sample semiconductor wafer to provide a sample wafer thickness map of said sample semiconductor wafer.

3. The machine-readable storage medium of claim 2, wherein said thermally induced errors comprise errors resulting from a difference in temperature between said semiconductor wafer and said interferometric system.

4. The machine-readable storage medium of claim 3, wherein the computer is further caused to perform the steps of:
   determining a sample cavity tilt value for a sample wafer being measured;
   calculating a comparison between said sample cavity tilt value and said first and second reference cavity tilt values; and
   compensating for said measurement error of said sample wafer using said comparison.

5. The machine-readable storage medium of claim 4, wherein the computer is further caused to perform the steps of:
   measuring a reference Δthickness map for said reference wafer;
   said reference Δthickness map showing thermally induced changes in thickness map for said reference wafer when said reference wafer is at a different temperature than said interferometric system, compared to when said reference wafer is at substantially the same temperature as the interferometric system.

6. The machine-readable storage medium of claim 5, wherein said step of compensating for said measurement error of said sample wafer using said comparison comprises;
   calculating a weighting factor from said comparison between said sample cavity tilt value and said first and second reference cavity tilt values;
   calculating a sample wafer Δthickness map from said reference Δthickness map weighted by said weighting factor; and
   applying said sample wafer Δthickness map to said sample wafer thickness map to obtain a compensated sample wafer thickness map.

7. The machine-readable storage medium of claim 6, wherein said step of calculating a weighting factor from said comparison between said sample cavity tilt value and said first and second reference cavity tilt values comprises:
   calculating reference ΔLCT equal to said first reference cavity tilt value minus said second reference cavity tilt value;
   calculating sample $\Delta CT_{sample}$ equal to said sample cavity tilt value minus said second reference cavity tilt value;
   said weighting factor α defined as $\alpha = \Delta CT_{sample}/\Delta LCT$.

8. The machine-readable storage medium of claim 1, wherein said steps of determining said first and second cavity tilt values and said sample cavity tilt value comprise measuring and calculating cavity tilt from data obtained in cavity ring region.

* * * * *